No. 620,855. Patented Mar. 7, 1899.
M. L. SEVERY.
THERMOCHEMICAL ELECTRIC BATTERY.
(Application filed Apr. 8, 1895.)

(Model.) 3 Sheets—Sheet 1.

WITNESSES:
Harry S. Rohrer.
Edwin G. Seabury.

INVENTOR
Melvin L. Severy,
BY
Howe & Kellogg
ATTORNEYS

THE NORRIS PETERS CO., PHOTO-LITHO., WASHINGTON, D. C.

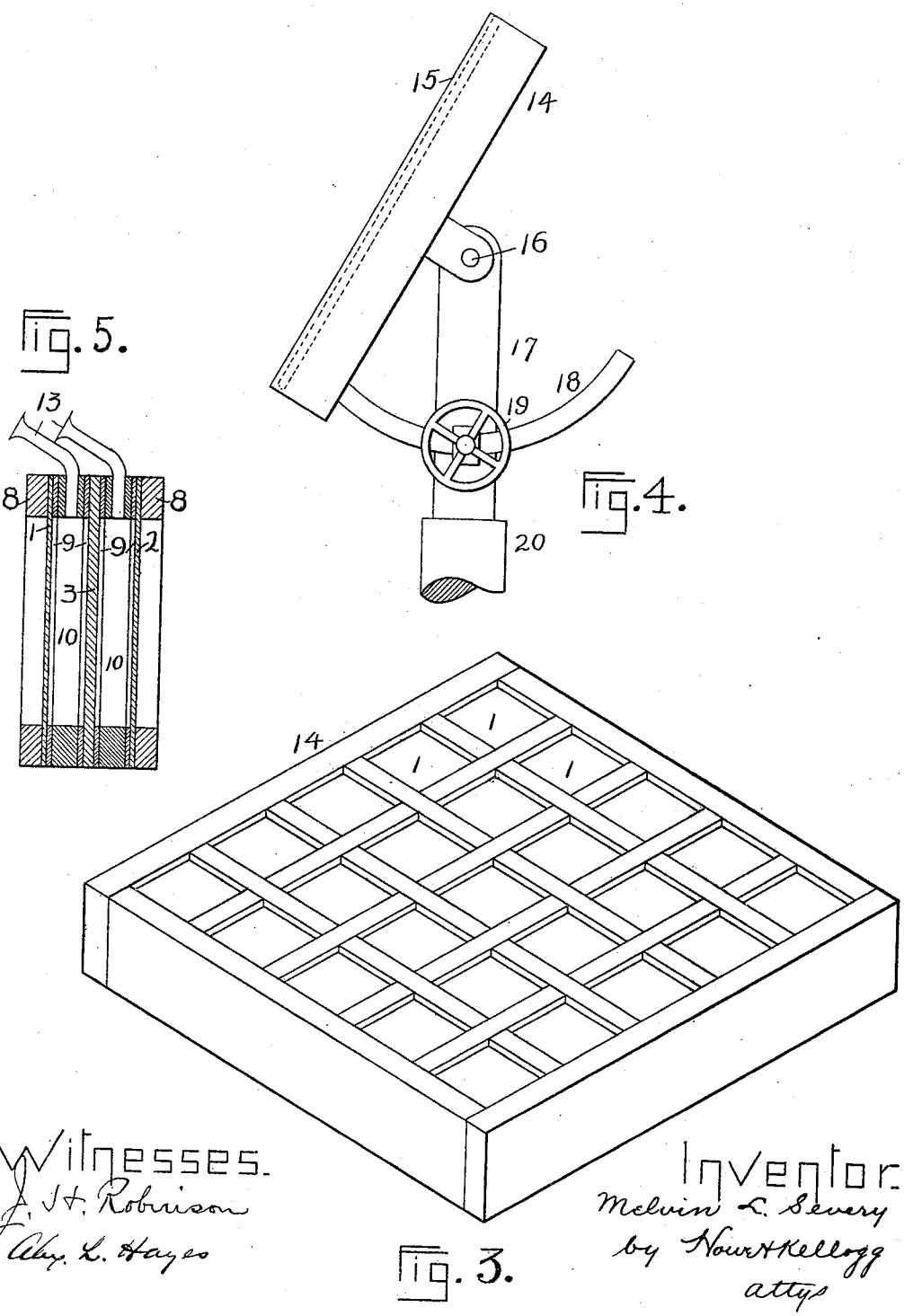

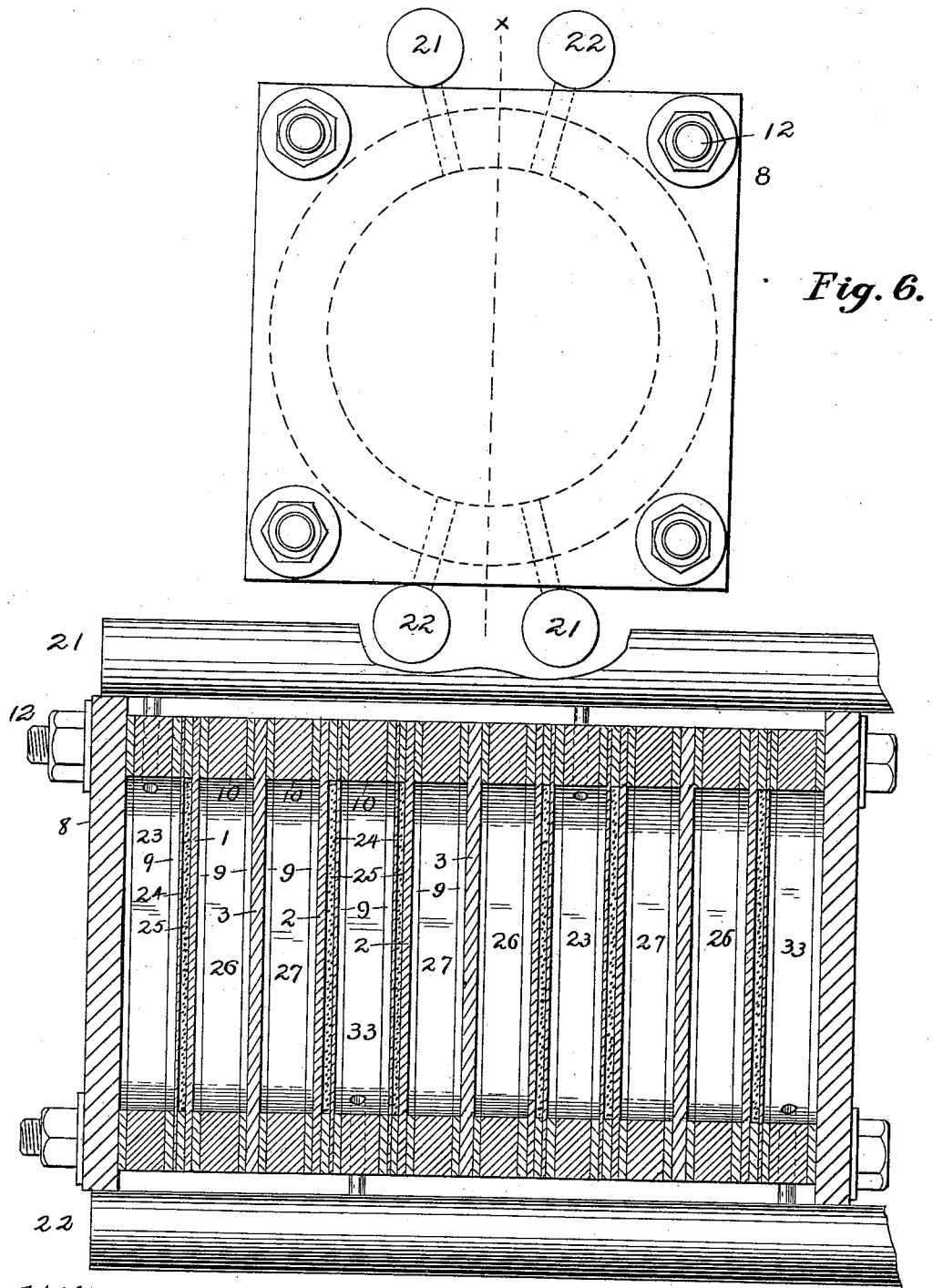

UNITED STATES PATENT OFFICE.

MELVIN L. SEVERY, OF BOSTON, MASSACHUSETTS, ASSIGNOR OF NINE-TWENTIETHS TO FRANCIS DOANE, OF NORWOOD, MASSACHUSETTS.

THERMOCHEMICAL ELECTRIC BATTERY.

SPECIFICATION forming part of Letters Patent No. 620,855, dated March 7, 1899.

Application filed April 8, 1895. Serial No. 544,959. (Model.)

*To all whom it may concern:*

Be it known that I, MELVIN L. SEVERY, a citizen of the United States, residing in Boston, in the county of Suffolk and State of Massachusetts, have invented certain new and useful Improvements in Thermochemical Electric Batteries, of which the following, taken in connection with the accompanying drawings, is a specification.

This invention has for its object the production of an efficient liquid thermal cell and one in which the difference of temperature between the electrodes can be maintained by solar or other direct heat or by the heat of gases, vapors, and liquids.

To this end the invention consists, first, in the use in the cell of two conducting liquids, one of which is a depolarizer; second, in the construction of the cell, substantially as hereinafter more fully set forth, in the form of a closed flat receptacle having its front and back each made of a conducting material and forming an electrode, thus permitting the arrangement of a series of these cells in the same plane and their combination with mechanism whereby the face of the cell or series of cells can be constantly exposed to the solar rays in accordance with the apparent movement of the sun, and, third, in the arrangement, substantially as hereinafter more fully set forth, of a series of cells in a closed receptacle in combination with means for exposing the electrodes in alternate series to the temperature produced by hot and cold circulating fluids, respectively.

Figure 1:
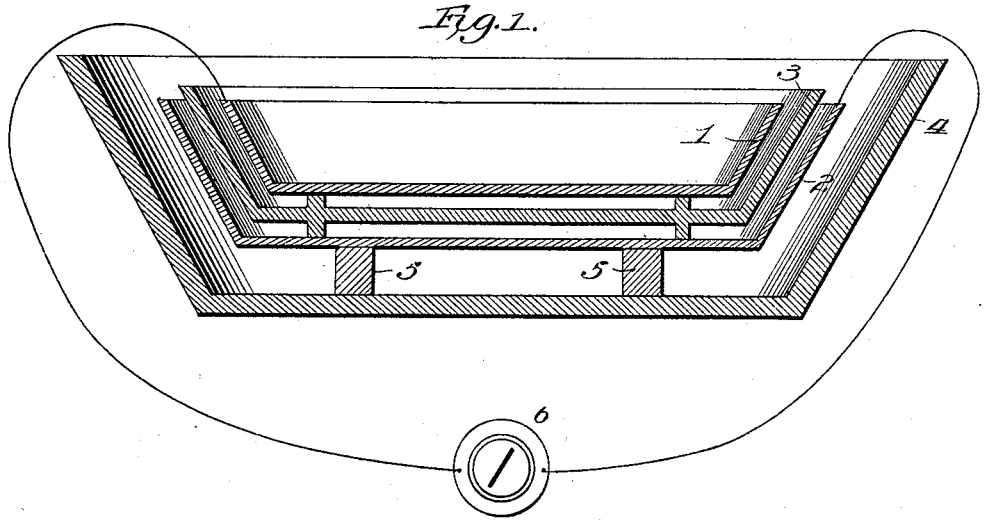
Figure 2:
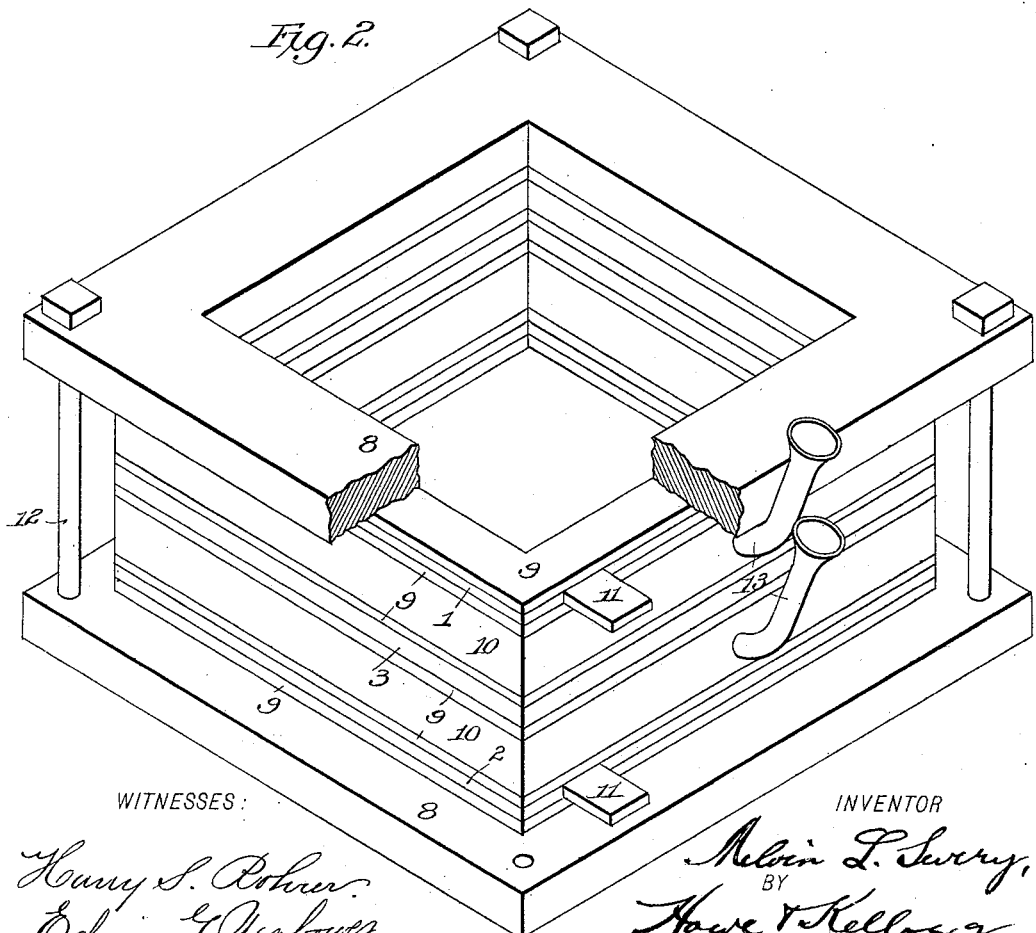

In the accompanying drawings, Figure 1 is a sectional view of a cell which embodies and illustrates the principle of my invention. Fig. 2 is an isometric view of a form of cell constructed in accordance with the principle of my invention and which I may use when the heat acting upon the cell is derived from some source of radiant heat—as, for example, the sun. Fig. 3 is an isometrical view of a series of these cells united to form a battery. Fig. 4 is a view of a device used for mounting the battery thus formed so that the face of the cells may constantly be exposed to the action of the sun's rays in accordance with the apparent annual and diurnal movement of the sun. Fig. 5 is a vertical sectional view of one of the cells when so mounted. Fig. 6 is an end view of a battery constructed in accordance with the principle of my invention in which the difference in temperature is produced by water at different temperatures. Fig. 7 is a sectional view of the same.

In the several figures like numerals refer to like parts.

Referring to the drawings, 1 is a plate of aluminium or other metal which is bent into a cup-shaped form and contains hot water. 2 is another cup of the same metal, externally concentric to the cup 1 and separated from the same by a space. Between these cups is another cup of some porous earthenware or other suitable substance, such as is used for the same purpose in galvanic batteries, which cup is provided with transverse projections upon the bottom, extending inward and outward, so that both cups 1 and 2 are respectively prevented from coming in contact with the porous cup or partition, and thus a space is formed on each side of the porous cup. In the space above the porous cup is a conducting solution and in the space below the porous cup is a depolarizing solution.

4 is a cup of any suitable material, such as glass, and 5 5 are blocks on the bottom of this cup, and on these blocks the cup 2 rests. The space thus formed contains cold water.

6 is a galvanometer, the opposite poles of which are connected by wires to the cups 1 and 2.

In the practice of my invention I have obtained good results in constancy and current by the use of an alkaline liquid in contact with one electrode and an acid liquid in contact with the other electrode, the acid liquid acting to oxidize the free hydrogen, which is generated when the battery is in action; but I can use any other combination of liquids in which one liquid acts as a depolarizer. I have also obtained good results by the use of aluminium electrodes, and I prefer this metal for the electrodes, but I do not limit myself to it. Other metals may be used or the electrodes may be made of any conducting material, the current being mainly due not to chemical action, but to a difference of temperature at the contact of the liquids with the electrodes, and these electrodes need not be of similar material, although this is desirable in order to prevent a counteracting current due to chemical action or which may be produced when the electrodes, though inert to the conducting solution or solutions, are of different materials.

A solution of sixty per centum of phosphate of soda ($Na_2HPO_4$) may be used for the alkaline liquid and a solution of twelve and one-half per centum of nitric acid ($HNO_3$) may be used for the acid or depolarizing solution and will give good results, especially with aluminium electrodes; but I do not limit myself to solutions of the above-named strength. I also prefer to make the soda solution of twelve and one-half per centum of a saturated solution of phosphate of soda.

The cell illustrated in Fig. 1 is shown for the purpose of illustrating the principle of my invention; but it is not the form in which I prefer to construct a cell for practical use. In this cell the difference in temperature is obtained by hot and cold liquids; but this difference in temperature may be obtained in any other way—as, for example, by steam or heated air, by direct contact of a flame with one end of one of the electrodes, or by solar heat or by radiant heat, as in the form of cell to be described.

In a cell producing a current of electricity by a difference in temperature between the electrodes and having each of the electrodes in a different liquid this current will be generated when either of the electrodes is of a higher temperature than the other. In the use of the electrodes and solutions more particularly described herein I have found that a stronger current is generated when the electrode in the depolarizing solution is of lower temperature than the other than when the contrary is the case, and therefore in the battery described this electrode is shown in contact with the depolarizing solution; but I do not limit myself to this arrangement, and in the various ways in which my invention can be carried into effect by the use of a depolarizing liquid it may be found desirable that the electrodes in the depolarizing liquid should be of a higher temperature than the other electrode. An advantage which this cell possesses over other means for generating an electric current by thermal effects is that it is efficient in ranges of temperature below that of boiling water and easily obtained. A difference in temperature of 100°—as, for example, between water at 70° and 170°—produces a considerable current. Lower or higher ranges of temperature can be used, and in carrying my invention into effect I do not limit myself to any particular range of temperature.

The construction of the cell shown in Fig. 2 is as follows: 8 8 are two opposite rectangular frames of wood or other suitable material. 1 is a rectangular plate of aluminium or some other metal, which is placed under the upper frame 8, but is separated and protected from the same by the gasket 9, of soft rubber or some other suitable material, and 10 is another rectangular frame, preferably of hard rubber, and which forms a box for the reception of the solution. 3 is a plate of porous earthernware, under which is another frame of hard rubber. Gaskets 9 9 separate the porous plate from the electrodes and from the frame 10, so that by the compression of the gaskets the box formed by the frame, the porous plate, and the metallic plate is made water-tight. The frames 8 8 are securely clamped together by any suitable device—as, for example, the bolts 12. The chamber formed under the plate 1 by the frame 10 contains a conducting solution which makes contact with the plate 1, and the chamber formed in the same manner under the porous partition contains a depolarizing solution which makes contact with the plate 2. A series of these cells may be united together in the same plane to form a battery, as shown in Figs. 3 and 4, the latter figure showing a battery of this description mounted upon a vertical standard by means of trunnions 16, so that the battery is capable of a movement in a rotating vertical and in a horizontal plane in order that it may follow the apparent movement of the sun.

Fig. 5 shows how bent tubes 13 can be used for filling the cavities formed by the frames 10 in order that the contents of the cavities may be retained, whatever may be the position of the battery when mounted as above described. In the battery shown in Figs. 6 and 7 a series of cells are shown as united together at different planes and having the necessary difference of temperature between the two plates of each cell produced by hot and cold water or other fluid.

Referring to the drawings, 8 8 are two plates of wood or any other suitable material, capable of being clamped together in any suitable manner—as, for example, by bolts. Between these plates are placed a series of metallic plates, porous partitions, and hard and soft rubber gaskets arranged as before stated in the description of the battery shown in Fig. 2 and numbered, respective, 1, 2, 3, 9, and 10. The pipes for conveying the hot and cold water or other fluid are shown, respectively, at 21 and 22 and are arranged in pairs on opposite sides of the structure, the pipes 21 21 for hot water or other fluid and the pipes 22 22 for cold water or other fluid being placed diagonally opposite one another. It has been found by experiment that the contact of hot and cold water with the metallic plates 1 and 2 has an injurious effect upon the plates, and in order to prevent this injurious effect and at the same time insure the conduction of heat to or away from the plates and their electrical insulation a metallic partition 24, preferably of tin, is placed on the outside of the plates 1 and 2 and separated from the same by a space 25, which is filled with glycerin or other liquid of similar properties in relation to the conduction of heat and electricity. As shown in the drawings, the hot-water pipe communicates with the chambers 23 and the cold-water pipe with the chambers 33. The space 26 is filled with a conducting solution and the space 27 with a depolarizing solution.

It is obvious that by the provision of plate-electrodes in a closed receptacle in which each pair of electrodes is separated by a partition of porous material, as described, and illustrated by Figs. 2 to 7, inclusive, each of these batteries can be placed in any position without interfering with their action, a result which has not before been accomplished.

In the description of my cell I have employed the general term "electrode" for the anode and cathode thereof. As a matter of fact, however, the negative electrode appears to be the one with which the nitric-acid solution is in contact and the positive electrode the one in the phosphate-of-soda solution.

Having thus described my invention, what I claim, and desire to secure by Letters Patent of the United States, is—

1. In a cell for the production of electricity, the combination, substantially as set forth, of two electrodes of a material which is chemically inert to the liquids in the cell; a conducting liquid in contact with each electrode, one of the liquids being a depolarizer; means for separating the liquids while maintaining the circuit; an external circuit, and means for maintaining a difference of temperature between the electrodes.

2. In a cell for the production of electricity, the combination, substantially as set forth, of two electrodes of similar material, which material is chemically inert to the liquids in the cell; a conducting liquid in contact with each electrode, one of the liquids being a depolarizer; means for separating the liquids while maintaining the circuit; an external circuit, and means for securing and maintaining a difference of temperature between the electrodes.

3. In a cell for the production of electricity, the combination, substantially as set forth, of two electrodes of similar metal, which metal is chemically inert to the liquids in the cell; a conducting liquid in contact with each electrode, one of the liquids being a depolarizer; means for separating the liquids while maintaining the circuit; an external circuit, and means for securing and maintaining a difference of temperature between the electrodes.

4. In a cell for the production of electricity, two electrodes of a material which is chemically inert to the liquids in the cell; a conducting liquid in contact with each electrode, one of the liquids being a depolarizer; means for separating these electrodes while maintaining the circuit; an external circuit, and means for securing and maintaining the electrode in the depolarizing liquid at a lower temperature than the other electrode.

5. In a cell for the production of electricity, the combination, substantially as set forth, of two electrodes; a conducting liquid in contact with each electrode, one of said liquids being a depolarizer; means for separating the liquids while maintaining the circuit; an external circuit, and means for heating one electrode by circulating about it a hot liquid which is not the conducting liquid in contact with the electrodes.

6. In a cell for the production of electricity, the combination, substantially as set forth, of two electrodes; a conducting liquid in contact with each electrode, one of said liquids being a depolarizer; means for separating the liquids while maintaining the circuit; an external circuit, and means for cooling one electrode by circulating about it a cold liquid which is not the conducting liquid in contact with the electrodes.

7. In a cell for the production of electricity, the combination, substantially as set forth, of two electrodes; a conducting liquid in contact with each electrode, one of said liquids being a depolarizer; means for separating the liquids while maintaining the circuit; an external circuit; means for heating one electrode by circulating about it a hot liquid which is not the conducting liquid in contact with the electrodes, and means for cooling the other electrode by circulating about it a cold liquid which is not the conducting liquid in contact with the electrodes.

8. The combination, substantially as set forth, of a series of thermal cells each consisting of a closed receptacle having its front and back each formed by an electrode of the cell; means for supporting said series of cells in the same plane, and means for maintaining the faces of these cells constantly exposed to the solar rays in accordance with the apparent movement of the sun.

9. In a cell for the production of electricity, the combination, substantially as set forth, of two electrodes each chemically inert to the liquids of the cell; an alkaline solution in contact with one electrode; an acid solution in contact with the other electrode; means for separating these liquids while maintaining the circuit; an external circuit, and means for securing and maintaining a difference of temperature between the electrodes.

10. In a cell for the production of electricity, the combination, substantially as set forth, of two electrodes of similar material each chemically inert to the liquids of the cell; an alkaline solution in contact with one electrode; an acid solution in contact with the other electrode; means for separating these liquids while maintaining the circuit, an external circuit, and means for securing and maintaining a difference of temperature between the electrodes.

11. In a cell for the production of electricity, the combination, substantially as set forth, of two electrodes of similar metal each chemically inert to the liquids of the cell; an alkaline solution in contact with one electrode; an acid solution in contact with the other electrode; means for separating these liquids while maintaining the circuit; an external circuit, and means for securing and maintaining a difference of temperature between the electrodes.

12. In a cell for the production of electricity, the combination, substantially as set forth, of two electrodes of aluminium; an alkaline solution in contact with one electrode; an acid solution in contact with the other electrode; means for separating these solutions while maintaining the circuit, and means for securing and maintaining a difference of temperature between the electrodes.

13. In a cell for the production of electricity, the combination, substantially as set forth, of two electrodes; a solution of phosphate of soda as described in contact with one electrode; a solution of nitric acid as described in contact with the other electrode; means for separating these solutions while maintaining the circuit, and means for securing and maintaining a difference of temperature between the electrodes.

14. In a cell for the production of electricity, the combination, substantially as set forth, of two electrodes of similar material; a solution of phosphate of soda as described in contact with one electrode; a solution of nitric acid as described, in contact with the other electrode; means for separating these solutions while maintaining the circuit, and means for securing and maintaining a difference of temperature between the electrodes.

15. In a cell for the production of electricity, the combination, substantially as set forth, of two electrodes of aluminium; a solution of phosphate of soda as described in contact with one electrode; a solution of nitric acid as described in contact with the other electrode; means for separating these solutions while maintaining the circuit, and means for securing and maintaining a difference of temperature between the electrodes.

16. In a cell for the production of electricity, the combination, substantially as set forth, of two electrodes each forming a wall of a closed cell; an external circuit between the electrodes; a porous partition between the electrodes; means for separating the electrodes from the porous partition; a conducting solution in the space between one electrode and the porous partition; a depolarizing solution in the space between the other electrode and the porous partition, and means applied to the surfaces of the electrodes for securing and maintaining a difference of temperature between them.

17. The combination, substantially as set forth, of two opposed frames 8, 8; means for clamping these frames together; two plates 1 and 2 of a conducting material placed between these frames and forming electrodes and covering the space inclosed by the sides of the frame; a partition 3 of some porous material between these plates; a frame 10 of some suitable non-conducting material on each side of the porous partition; a conducting liquid contained in the space inclosed by the sides of the frame 10, the porous partition, and one of the plates; a depolarizing liquid contained in the space formed by the sides of the other frame 10, the porous partition, and the other plate, and gaskets 9 between the various parts to render the joints liquid-tight.

18. The combination, substantially as set forth, of two frames 8, 8; means for clamping the same together; a series of frames 10 arranged between the frames 8, 8; a series of plates 1, 2 forming electrodes and arranged, one plate between the first and second of the frames 10 and the next plate between the third and fourth of the frames 10, and so on in the same order; a partition of porous material between the second and third of the frames 10 and another between the fifth and sixth of the frames 10, and so on in the same order; a conducting liquid in the space 26 between a porous partition and a plate 1; a depolarizing liquid in the space 27 between the porous partition and a plate; a hot fluid in the spaces 13; a colder fluid in the spaces 33; two pairs of pipes, one pipe conveying a hot fluid and the other a colder fluid, and placed on opposite sides of the frame whereby the pipes conveying the hot and colder fluids are diagonally opposed; and pipes forming a communication with the hot-fluid pipes and the spaces containing the hot fluid, and between the cold-fluid pipe and the spaces containing the cold fluid.

19. The combination, substantially as set forth, of two frames 8, 8; means for clamping the same together; a series of frames 10 arranged between the frames 8, 8; a series of plates 1, 2 forming electrodes, arranged in series, one plate between the first and second of the frames 10 and the next plate between the third and fourth of the frames 10, and so on in the same order; a partition of porous material between the second and third of the frames 10 and another between the fifth and sixth of the frames 10; a metallic partition 24 exterior to each of the plates 1 and 2 and at such a distance from it that a space is formed; glycerin or other liquid of similar properties in relation to the conduction of heat and electricity contained in said space; a conducting liquid in the space 26 between the porous partition and a plate 1; a depolarizing liquid in the space 27 between the porous partition and a plate 2; a hot fluid in the space 23; a cold fluid in the space 33; two pairs of pipes, one pipe conveying the hot fluid and the other the cold fluid, and placed on opposite sides of the frame so that the pipes containing the hot and cold fluid are diagonally opposite; and pipes forming a communication with the hot-fluid pipes and the spaces containing the hot fluid, and between the cold-fluid pipes and the spaces containing the cold fluid.

In testimony whereof I have hereunto subscribed my name this 18th day of March, A. D. 1895.

MELVIN L. SEVERY.

Witnesses:
CHAS. A. KELLOGG,
CHAS. F. HOWE.